US008009979B2

United States Patent
Shirono

(10) Patent No.: US 8,009,979 B2
(45) Date of Patent: Aug. 30, 2011

(54) IMAGING DEVICE UNIT AND ELECTRONIC APPARATUS INCLUDING THE IMAGING DEVICE UNIT

(75) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/823,500

(22) Filed: Jun. 25, 2010

(65) Prior Publication Data

US 2011/0005030 A1    Jan. 13, 2011

(30) Foreign Application Priority Data

Jul. 8, 2009  (JP) .................. 2009-161596
Feb. 18, 2010  (KR) .......... 10-2010-0014726

(51) Int. Cl.
    *G03B 17/02*    (2006.01)
(52) U.S. Cl. ....................................... 396/535
(58) Field of Classification Search .......... 396/535
    See application file for complete search history.

(56) References Cited

U.S. PATENT DOCUMENTS

| 2010/0053891 | A1* | 3/2010 | Arik et al. ............... 361/692 |
| 2010/0165462 | A1* | 7/2010 | Kawai et al. ............ 359/513 |
| 2010/0220394 | A1* | 9/2010 | Kawai ...................... 359/508 |
| 2010/0315712 | A1* | 12/2010 | Kawai ...................... 359/508 |

FOREIGN PATENT DOCUMENTS

| JP | 2006-203776 A | 8/2006 |
| JP | 2007-206640 A | 8/2007 |
| JP | 2008-227939 A | 9/2008 |

* cited by examiner

*Primary Examiner* — Rodney E Fuller
(74) *Attorney, Agent, or Firm* — Drinker Biddle & Reath LLP

(57) ABSTRACT

An imaging device unit and an electronic apparatus including the imaging device unit are provided. The imaging device unit includes: an imaging device comprising a surface on which an optical image of a subject is to be formed, and for converting the optical image to an electrical signal; an optical unit disposed nearer to the subject than the imaging device; a piezoelectric element mounted on the optical unit to vibrate the optical unit; and an air stream supply unit for generating an air stream by using a change in a capacity of a predetermined space, the air stream being generated due to vibration of the piezoelectric element to supply the air stream to a surface of the optical unit.

10 Claims, 8 Drawing Sheets

IMAGING DEVICE UNIT AND ELECTRONIC APPARATUS INCLUDING THE IMAGING DEVICE UNIT

CROSS-REFERENCE TO RELATED PATENT APPLICATION

This application claims the benefit of Japanese Patent Application No. 2009-161596, filed on Jul. 8, 2009, in the Japan Patent Office and Korean Patent Application No. 10-2010-0014726, filed on Feb. 18, 2010, in the Korean Intellectual Property Office, the disclosures of which are incorporated herein in their entirety by reference.

BACKGROUND

Various embodiments of the invention relate to an imaging device unit and an electronic apparatus including the imaging device unit.

The conventional art, for example, Japanese Laid-open Patent No. 2007-206640, discloses a dust removing method for removing dust attached to a photographing unit, in which an air stream is generated on a front surface of a low pass filter to remove dust, and a fluid pump that uses a piezoelectric element as a driving source is arranged.

Also, Japanese Laid-open Patent No. 2006-203776 discloses a method in which dust that is shaken off due to vibration of a protection glass is taken away from the protection glass via an air flow generated by an operation member.

In addition, Japanese Laid-open Patent No. 2008-227939 discloses a cooling structure of an imaging device module including a fluid circulation unit that circulates and supplies an operational fluid in a fluid circulation path to transport heat.

However, although an air stream is generated on the front surface of the low pass filter according to the method disclosed in Japanese Laid-open Patent No. 2007-206640, if the dust strongly adheres, it is difficult to remove the dust attached to the surface of the low pass filter with only the air stream.

Also, in the method disclosed in Japanese Laid-open Patent No. 2006-203776, two driving sources, that is, a driving source for generating vibration on the protection glass and a driving source for generating an air stream are needed, and thus it is difficult to manufacture a compact device and the manufacturing costs thereof is also increased.

In addition, regarding the method disclosed in Japanese Laid-open Patent No. 2008-227939, improvement of cooling efficiency of the imaging device is accomplished but removal of dust attached to the imaging device unit is not considered at all.

SUMMARY

Various embodiments of the invention provide an imaging device unit in which dust or particles attached to the imaging device unit are completely removed therefrom, and an electronic apparatus including the imaging device unit.

According to an embodiment of the invention, there is provided an imaging device unit comprising: an imaging device comprising an imaging surface on which an optical image of a subject is to be formed, and for converting the optical image to an electrical signal; an optical unit disposed nearer to the subject than the imaging device; a piezoelectric element mounted on the optical unit to vibrate the optical unit; and an air stream supply unit for generating an air stream by using a change in a capacity of a predetermined space, the change in the capacity of the predetermined space in the supporting frame being generated due to vibration of the piezoelectric element to supply the air stream to a surface of the optical unit.

The air stream supply unit may generate the air stream by using a change in a capacity of inner space between the optical unit and the imaging device.

The air stream supply unit may comprise: an inlet valve for introducing air into the inner space when the capacity of the inner space is increased; and a outlet valve for discharging the air from the inner space when the capacity of the inner space is reduced, wherein the air stream supply unit supplies the air stream discharged from the outlet valve to the surface of the optical unit.

The imaging device unit may further comprise: a plate mounted on a boundary portion of the optical unit, wherein at least a portion of the plate extends beyond the optical unit; and a support frame for supporting the optical unit and the imaging device, wherein the air stream supply unit generates the air stream by using a change in a capacity of a predetermined space in the supporting frame, the change in the capacity of the predetermined space in the supporting frame being generated due to vibration of the plate.

A first hole may be formed in the plate, and air may be discharged through the first hole according to a change in a capacity of the space, and a second hole may be formed in a portion of the support frame corresponding to the first hole and connected to a path that supplies the air stream to the optical unit, wherein an air stream greater than the air stream through the first hole is supplied to the surface of the optical unit, due to a Venturi effect that is generated when the air stream is passed through the first and second holes.

According to another aspect of the present invention, there is provided an electronic apparatus comprising: a photographing optical system for forming an optical image of a subject; an imaging device comprising a surface on which the optical image of a subject is to be formed, and for converting the optical image to an electrical signal; an optical unit disposed nearer to the subject than the imaging device; a piezoelectric element mounted on the optical unit to vibrate the optical unit; and an air stream supply unit for generating an air stream by using a change in a capacity of a predetermined space, the change in the capacity of the predetermined space in the supporting frame being generated due to vibration of the piezoelectric element to supply the air stream to a surface of the optical unit.

The air stream supply unit may generate the air stream by using a change in a capacity of inner space between the optical unit and the imaging device.

The air stream supply unit may comprise: an inlet valve for introducing air into the inner space when the capacity of the inner space is increased; and an outlet valve for discharging the air from the inner space when the capacity of the inner space is reduced, wherein the air stream supply unit supplies the air stream discharged from the outlet valve to the surface of the optical unit.

The electronic apparatus may further comprise: a plate mounted on a boundary portion of the optical unit, wherein at least a portion of the plate extends beyond the optical unit; and a support frame for supporting the optical unit and the imaging device, wherein the air stream supply unit generates an air stream by using a change in a capacity of the predetermined space in the support frame, the change in the capacity of the predetermined space in the supporting frame being generated due to vibration of the plate.

A first hole may be formed in the plate, and air may be discharged through the first hole according to a change in a capacity of the space, and a second hole may be formed in a portion of the support frame corresponding to the first hole and connected to a path that supplies the air stream to the optical unit, wherein an air stream greater than the air stream through the first hole is supplied to the surface of the optical unit, due to a Venturi effect that is generated when the air stream is passed through the first and second holes.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EMBODIMENTS

Figure 1:
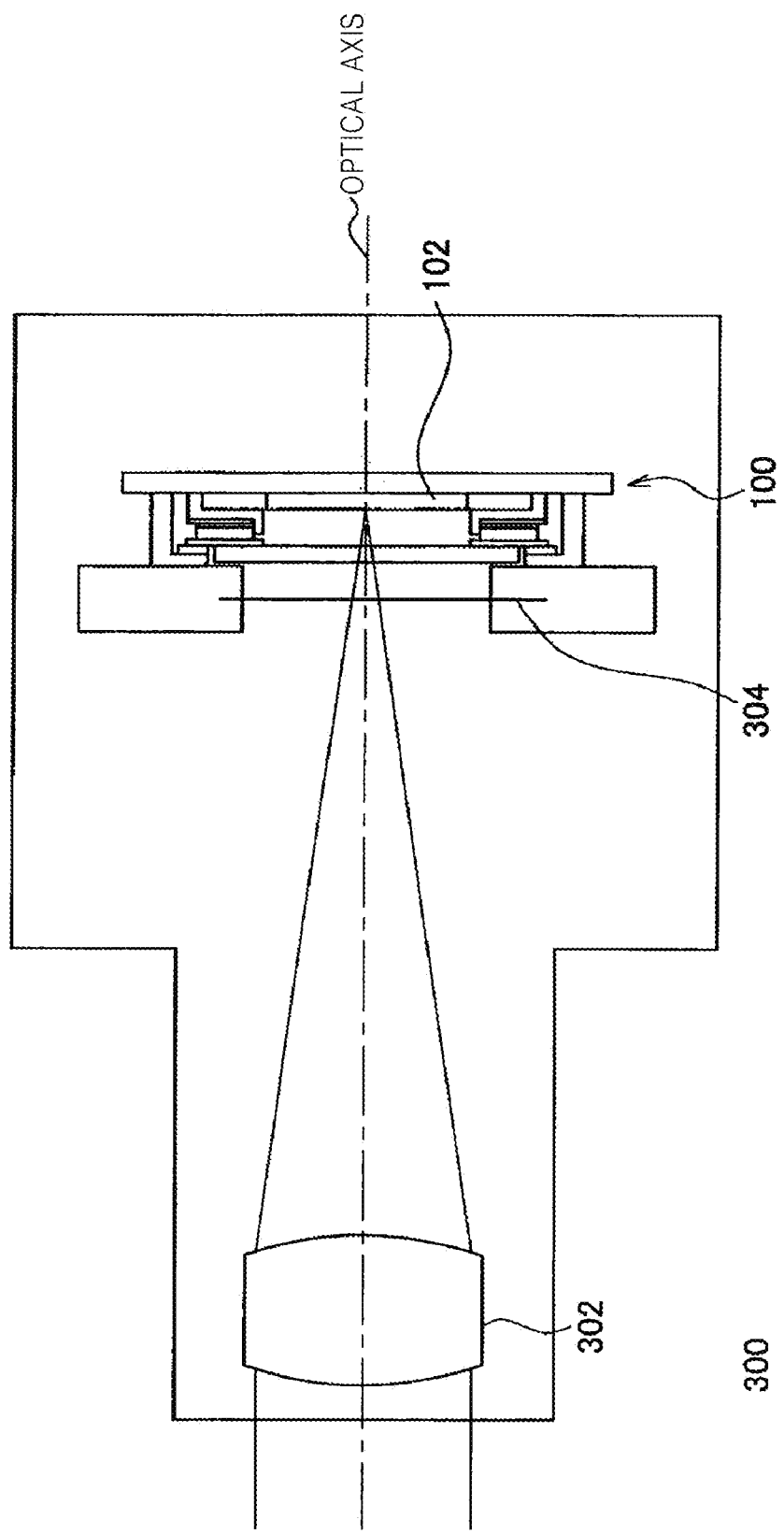
FIG. 1 is a cross-sectional view illustrating main elements of a photographing apparatus as an electronic apparatus according to embodiments of the invention.

Various embodiments of the invention will now be described more fully with reference to the accompanying drawings, in which exemplary embodiments of the invention are shown. Like elements having substantially the same configuration are denoted with like reference numerals and descriptions thereof will not be repeated.

First Embodiment

FIG. 1 is a cross-sectional view illustrating main elements of a photographing apparatus 300, which may be an electronic apparatus described with respect to various embodiments, wherein the photographing apparatus 300 is seen along a horizontal direction.

The photographing apparatus 300 includes a lens 302 therein.

The photographing apparatus 300 also includes a focal point adjusting unit (not shown) that moves all of the lens 302 or some of lenses of the lens 302 in an optical axis direction to adjust an image forming position.

Also, an imaging device unit 100 is arranged in a case of the photographing apparatus 300 facing a side of the lens 302 that faces away from a subject.

The imaging device unit 100 includes an imaging device 102 that may be a photoelectric conversion device, such as a charge coupled device (CCD) sensor or a complementary metal oxide semiconductor (CMOS) sensor. An image of the subject is formed on an imaging surface of the imaging device 102 through the lens 302.

Also, a shutter 304 that adjusts an exposure amount with respect to the imaging device 102 is disposed between the lens 302 and the imaging device unit 100. Support frames 104 and 204 of the imaging device unit 100, which will be described below, are fixed to a main body of the photographing apparatus 300.

Hereinafter, the photographing apparatus 300 is described as an electronic apparatus including an imaging device unit 100 or 200 according to embodiments of the present invention. However, the electronic apparatus is not limited thereto, and may also be a personal computer (PC), a mobile appliance, such as a mobile phone, or the like.

Figure 2:
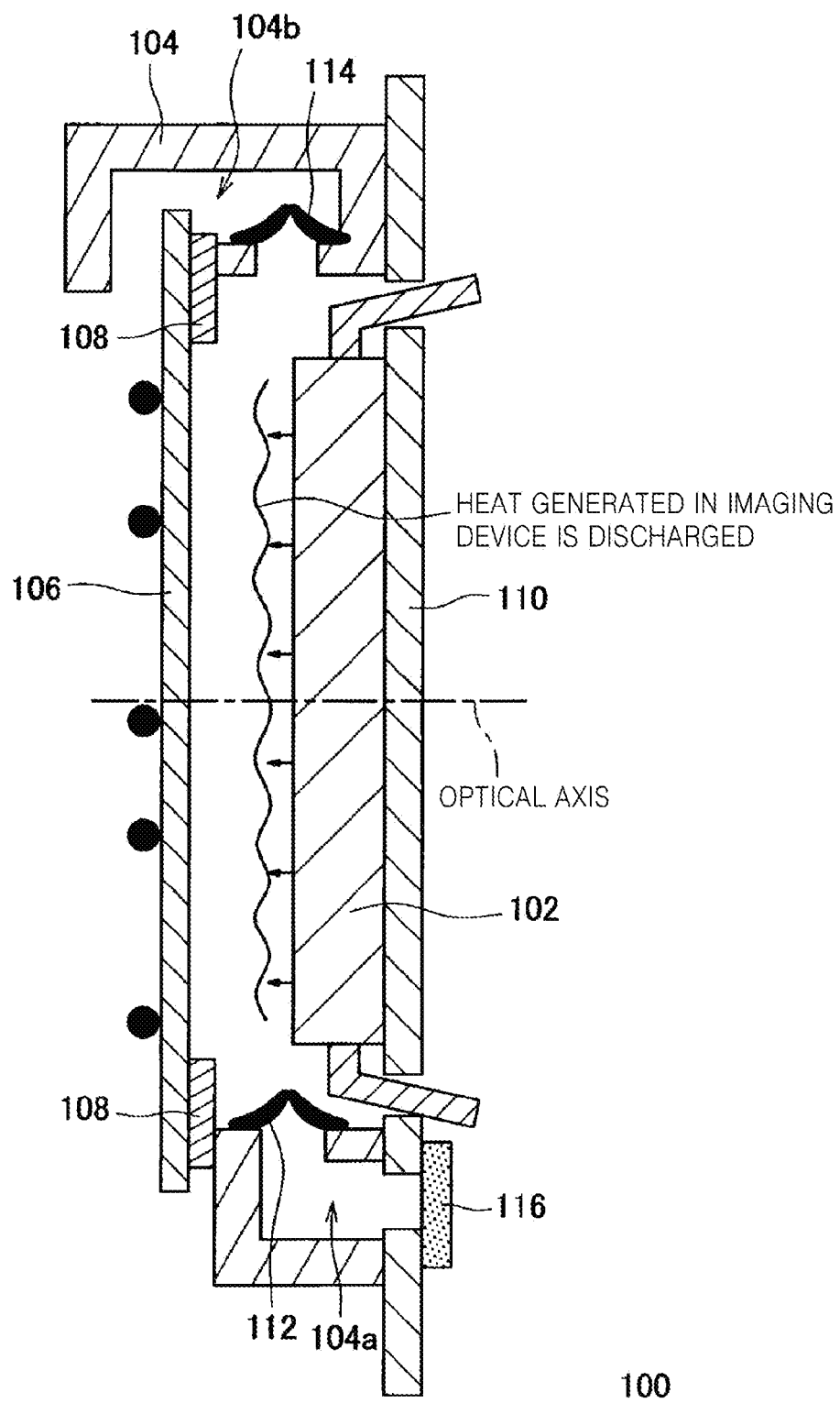
FIG. 2 is a cross-sectional view illustrating an imaging device unit according to an embodiment of the present invention.

FIG. 2 is an enlarged cross-sectional view illustrating the imaging device unit 100.

Referring to FIG. 2, the imaging device unit 100 includes the imaging device 102, a support frame 104, a low pass filter (LPF) 106, a piezoelectric element 108, a substrate 110, an inlet valve 112, an outlet valve 114, and a dust prevention filter 116.

In addition, the LPF 106 is described here as an example of an optical unit that is vibrated by using the piezoelectric element 108; however, the optical unit may also be, for example, a lens or a glass plate.

Referring to FIG. 2, the imaging device 102 is mounted on the substrate 110, and the substrate 110 is fixed with respect to the support frame 104.

The support frame 104 is supported by the case of the photographing apparatus 300.

Two piezoelectric elements 108 are respectively arranged on upper and lower portions of the LPF 106 around an optical axis. A flexible printed circuit board (not shown) that transmits a signal to the piezoelectric elements 108 is attached on a surface of the piezoelectric elements 108 facing the imaging device 102.

The piezoelectric elements 108 are adhered to the LPF 106 by using an adhesive such as an epoxy adhesive, an ultraviolet ray (UV) curing adhesive, or the like.

The piezoelectric elements 108 are arranged with respect to the optical axis, in both the current embodiment as well as in a next embodiment of the present invention. Also, the surface of the piezoelectric elements 108 facing the imaging device 102 is fixed to the support frame 104.

Referring to FIG. 2, an air inlet path 104a and an air outlet path 104b are formed in the support frame 104.

The inlet valve 112 is arranged in the air inlet path 104a, and the outlet valve 114 is arranged in the air outlet path 104b.

When the inlet valve 112 and the outlet valve 114 are closed, a space between the imaging device 102 and the LPF 106 is sealed. Also, the air inlet path 104a connects to air outside the imaging device unit 100, and the dust prevention filter 116 is disposed at an inlet of the air inlet path 104a.

The piezoelectric elements 108, which are disposed on the upper and lower portions of the imaging device unit 100, are polarized in the same direction as a plate thickness direction of the piezoelectric elements 108, that is, the optical axis direction of the lens 302, and a periodic voltage is applied to the piezoelectric elements 108 by using an oscillator to supply a periodic signal to the piezoelectric elements 108. The periodic signal may be a square wave or a sine wave. In addition, periodic voltages of the same phase or opposite phases may be applied to the two piezoelectric elements 108.

When a voltage is applied to the piezoelectric elements 108, the piezoelectric elements 108 move in an extensional-compressional vibration mode in a length direction of the piezoelectric elements 108. Here, the LPF 106 adhered to the piezoelectric elements 108 is hardly extended in an extension direction of the piezoelectric elements 108, and thus bending vibration occurs in a complex body including the piezoelectric elements 108 and the LPF 106 due to a difference in extension rates of the piezoelectric elements 108 and the LPF 106. Accordingly, a material point of an antinode of the bending vibration due to the piezoelectric elements 108 vibrates in the optical axis direction and has the greatest amplitude of vibration. Also, the amplitude of vibration of a material point at a node of the bending vibration is negligible, which means that a node of the bending vibration only performs rotational movement. A material point between an antinode and a node of the bending vibration conducts vibration in circular arcs around a node near to the material point.

As described above, the LPF 106 attached to the piezoelectric elements 108 is in bending motion according to the extension-compression motion of the piezoelectric elements 108. Accordingly, dust or particles attached to a surface of the LPF 106 may be detached and removed from the surface of the LPF 106.

Figure 3:
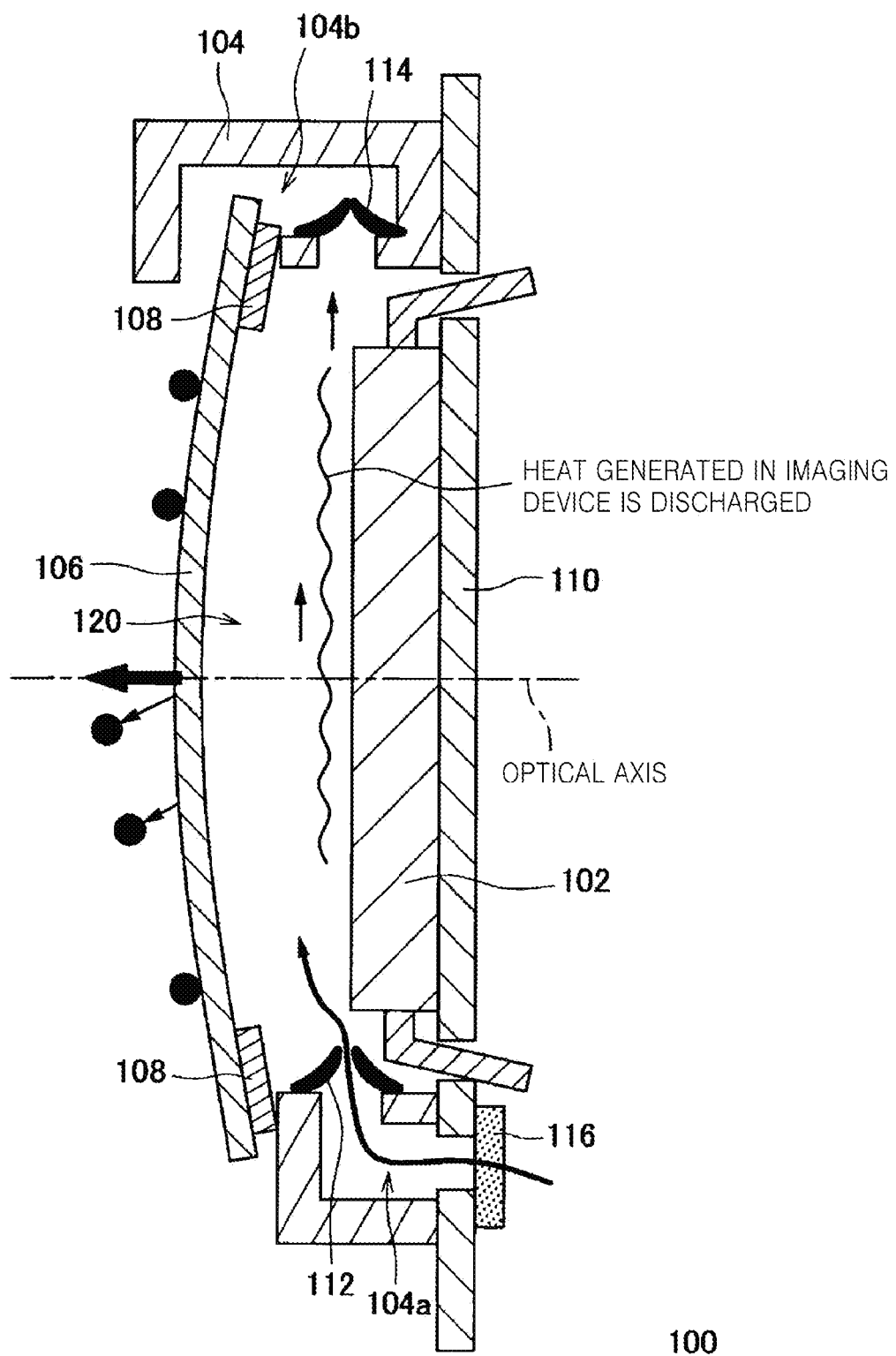
FIGS. 3 and 4 illustrate a low pass filter in bending motion, according to an embodiment of the present invention.
Figure 4:
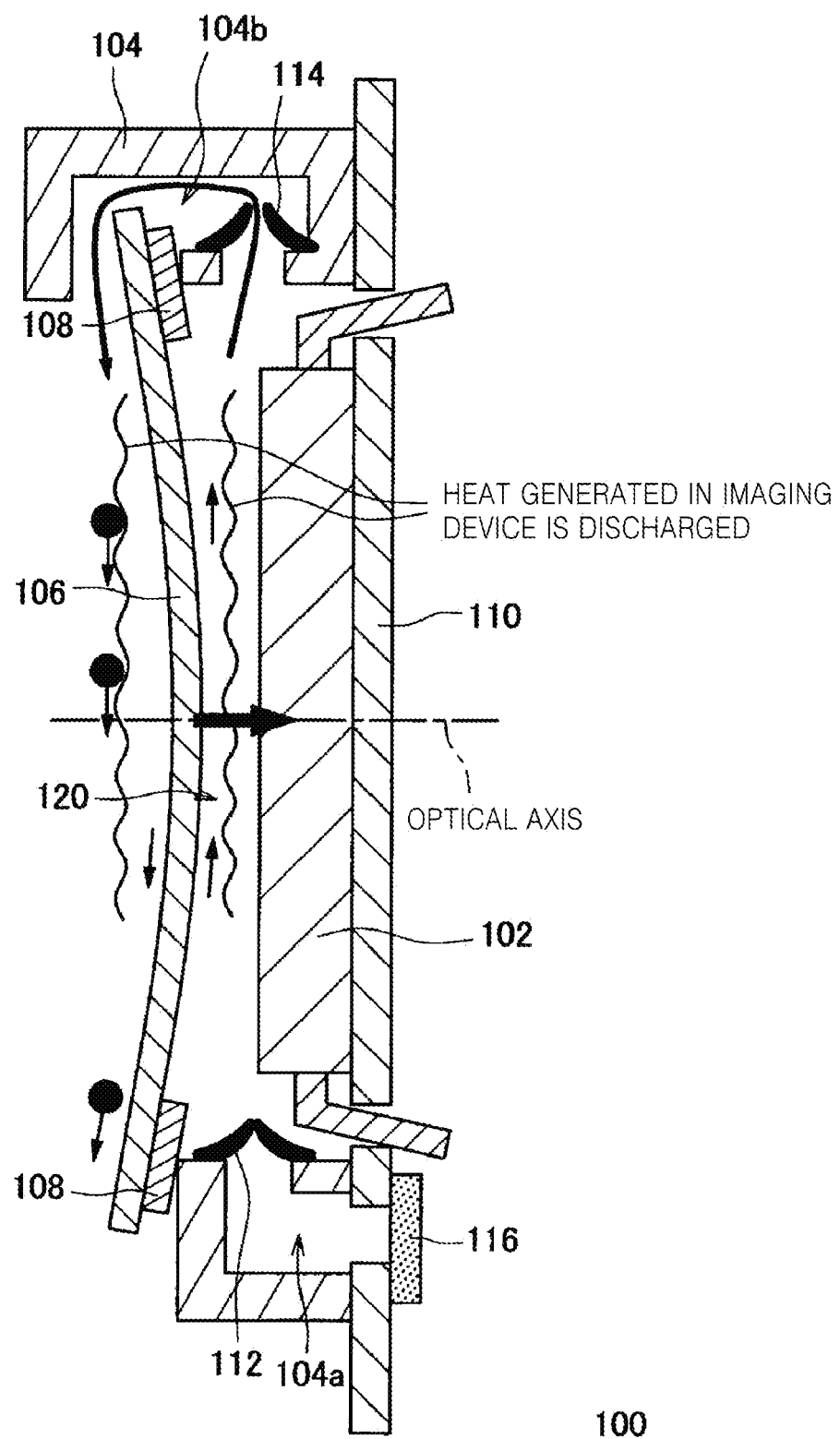

FIGS. 3 and 4 illustrate the LPF 106 in bending motion, according to an embodiment of the present invention. In FIG. 3, a surface of the LPF 106 that is to face the subject is convex, and in FIG. 4, the surface of the LPF 106 that is to face the subject is concave. Referring to FIG. 3, a capacity of an inner space 120 between the LPF 106 and the imaging device 102 is larger than usual, that is, than when the LPF 106 is not deformed. Referring to FIG. 4, the capacity of the inner space 120 between the LPF 106 and the imaging device 102 is smaller than usual.

In the imaging device unit 100, the LPF 106 is in bending motion and causes the capacity of the inner space 120 to change. Due to the change in the capacity of the inner space 120, the inlet valve 112 and the outlet valve 114 are opened or closed to generate an air stream in the inner space 120 between the LPF 106 and the imaging device 102 and on a front surface of the LPF 106.

The inlet valve 112 and the outlet valve 114 are formed of an elastic material such as rubber, and are opened or closed according to the change in the capacity (or pressure) of the inner space 120 as illustrated in FIGS. 3 and 4. The inlet valve 112 is opened when a pressure of the inner space 120 is lower than a pressure outside the imaging device unit 100, and passes an air stream from the air inlet path 104a to the inner space 120. Also, the inlet valve 112 is closed when the pressure of the inner space 120 is higher than the pressure outside, and blocks an air stream from the inner space 120 to the air inlet path 104a.

The outlet valve 114 is closed when the pressure of the inner space 120 is lower than the pressure outside, and blocks an air stream from the air outlet path 104b to the inner space 120. Also, the outlet valve 114 is opened when the pressure of the inner space 120 is higher than the pressure outside and passes an air stream in a direction from the inner space 120 to the air outlet path 104b.

As illustrated in FIG. 3, when the surface of the LPF 106 that is to face the subject is a convex surface, the capacity of the inner space 120 between the LPF 106 and the imaging device 102 is increased and the pressure of the inner space 120 is lowered accordingly. Thus air from outside the imaging device unit 100 is passed from the air inlet path 104a through the inlet valve 112 and flows into the inner space 120. The air passed into the inner space 120 is preserved therein because the outlet valve 114 is closed. Here, dust or particles attached to the surface of the LPF 106, particularly, on portions where amplitude of bending motion is large, are detached when the surface of the LPF 106 is deformed into a convex surface.

Next, when the surface of the LPF 106 is deformed into a concave surface as illustrated in FIG. 4, the capacity of the inner space 102 between the LPF 106 and the imaging device 102 is reduced and thus the pressure of the inner space 120 is increased. Accordingly, the air in the inner space 120 passes through the outlet valve 114 and is discharged to the air outlet path 104b. Also, dust or particles attached to the surface of the LPF 106, particularly, on portions where amplitude of bending motion is large, are detached when the surface of the LPF 106 is deformed into a concave surface.

The air stream discharged to the air outlet path 104b flows along the surface of the LPF 106 because an exit of the air outlet path 104b is installed to open in a direction parallel to the surface of the LPF 106. Thus, the dust or particles detached due to the vibration of the LPF 106 flow together with the air stream and are discharge out of a light path.

According to the current embodiment, the inlet valve 112, the outlet valve 114, the air inlet path 104a, and the air outlet path 104b constitute an air stream supply unit.

Also, as the air stream flows along the surface of the LPF 106, the dust or particles remaining on the surface of the LPF 106 are removed by the air stream. Amplitude of vibration in the optical axis direction is negligible at a node, and thus it is assumed that dust or particles may remain on the surface of the LPF 106. By flowing the air stream, the dust or particles remaining at a node are transported completely out of the light path.

Also, as the dust or particles can be removed by using the air stream, only one vibration mode is needed for the piezoelectric elements 108, and thus just one piezoelectric element 108 and one driving circuit may be used. Accordingly, the manufacturing costs may be significantly reduced.

Also, by generating an air stream from the inner space 120 to outside the imaging device unit 100, heat generated by the imaging device 102 may be transferred out of the inner space 120, and outside air may be introduced into the inner space 120, thereby cooling the imaging device 102. Accordingly, the imaging device 102 may be efficiently cooled, thereby preventing noise and deterioration of image quality due to excessive heat in the imaging device 102.

As described above, according to the current embodiment, the dust or particles on the surface of the LPF 106 are removed by using bending motion of the LPF 106 generated due to vibration of the piezoelectric elements 108 and, at the same time, an air stream may be generated due to a change in the capacity of the inner space 120 according to the bending motion. Accordingly, the dust or particles detached by the bending motion are transported out of the light path and at the same time, dust or particles that are not detached by the bending motion and that remain on the surface of the LPF 106 are also transported out of the light path by using the air stream.

Also, by generating an air stream from the inner space 120 to outside the imaging device unit 100, heat generated in the imaging device 102 may be actively discharged, and cool air from outside may be introduced into the inner space 120. Accordingly, the imaging device 102 may be efficiently cooled, thereby preventing noise and deterioration of image quality due to excessive heat in the imaging device 102.

Second Embodiment

Figure 5:
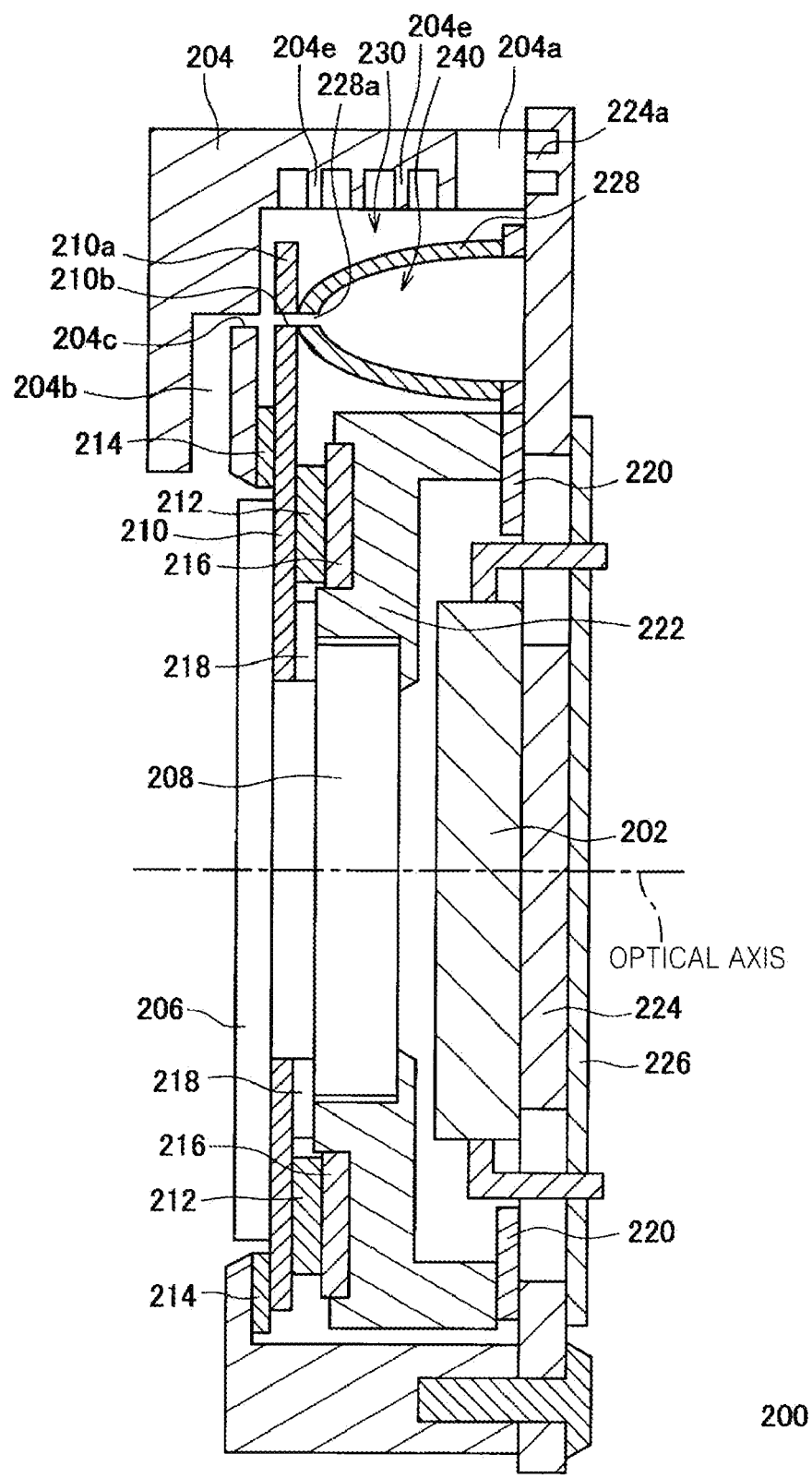
FIG. 5 is a cross-sectional view illustrating an imaging device unit according to another embodiment of the present invention.

Hereinafter, an imaging device unit according to another embodiment of the present invention is described. FIG. 5 is a cross-sectional view illustrating an imaging device unit 200 according to another embodiment.

Referring to FIG. 5, the imaging device unit 200 includes an imaging device 202, a support frame 204, LPFs 206 and 208, a metal plate 210, a piezoelectric element 212, cushioning members 214, 216, 218, and 220, an inner support frame 222, a heat dissipation plate 224, a substrate 226, and a pump chamber rubber 228.

Referring to FIG. 5, the imaging device 202 is mounted on the substrate 226, and the heat dissipation plate 224 is disposed between the imaging device 202 and the substrate 226.

The LPF 208 is disposed more toward the subject than the imaging device 202 and supported by the inner support frame 222. The inner support frame 222 is supported by the heat dissipation plate 224 via the cushioning member 220. Also, the LPF 206 is disposed more toward the subject than the LPF 208.

As in the previous embodiment, two piezoelectric elements 212 are disposed around an optical axis. A flexible printed circuit board (not shown) that transmits a signal to the piezoelectric elements 212 is attached to a surface of the piezoelectric elements 212 facing the imaging device 202. Also, the piezoelectric elements 212 are installed to the inner support frame 222 via the cushioning member 216.

Also, the piezoelectric elements 212 are fixed to the LPF 206 via the metal plate 210, and the metal plate 210 is mounted to the support frame 204 via the cushioning member 214. Also, the cushioning member 218 is interposed between the metal plate 210 and the LPF 208 and the inner support frame 222.

The metal plate 210 is mounted on a surface of the LPF 206 facing the imaging device 202. The metal plate 210 is adhered to the LPF 206 by using an adhesive such as an epoxy adhesive, a UV ray curing adhesive, or the like.

Also, the piezoelectric elements 212 are adhered to the metal plate 210 by using an adhesive such as an epoxy adhesive, a UV ray curing adhesive, or the like.

The support frame 204 and the heat dissipation plate 224 are formed of a metal that has a high thermal conductivity, such as aluminum.

While the LPFs 206 and 208, the piezoelectric elements 212, the inner support frame 222, and the imaging device 202 are disposed between the support frame 204 and the heat dissipation plate 224, the support frame 204 and the heat dissipation plate 224 are affixed, e.g., by a screw, to each other.

As illustrated in FIG. 5, the metal plate 210 has an extension portion 210a that extends from the metal plate 210. Also, an inner space 230 for arranging the extension portion 210a and a pump chamber 240 is disposed in an upper portion in the support frame 204. The pump chamber rubber 228 is disposed in the inner space 230.

The pump chamber rubber 228 is elastically formed of an elastic member, e.g., rubber. The pump chamber rubber 228 may have a ball-shaped external form, and an end portion of the pump chamber rubber 228 is connected (adhered) to the extension portion 210a of the metal plate 210.

An end portion of the pump chamber rubber 228 adjacent to the heat dissipation plate 224 is closely adhered to the heat dissipation plate 224. The pump chamber 240 is formed in the pump chamber rubber 228.

Also, a hole 228a that forms a nozzle is formed in another end portion of the pump chamber rubber 228. Also, a hole 210b is formed in a portion of the metal plate 210 corresponding to the hole 228a, and the hole 210b and the hole 228a are connected to each other.

An air inlet path 204a and an air outlet path 204b are formed in the support frame 204.

The air inlet path 204a is a path for connecting a space outside of the imaging device unit 200 and the inner space 230. Also, the air outlet path 204b is parallel to a surface of the LPF 206 as in the first embodiment.

Also, a hole 204c is formed in a portion where the air outlet path 204b and the inner space 230 are connected, corresponding to the hole 210b of the metal plate 210. As will be described later, the hole 228a, the hole 210b, and the hole 204c constitute a Venturi nozzle so as to introduce an air stream into the air outlet path 204b.

Figure 6:
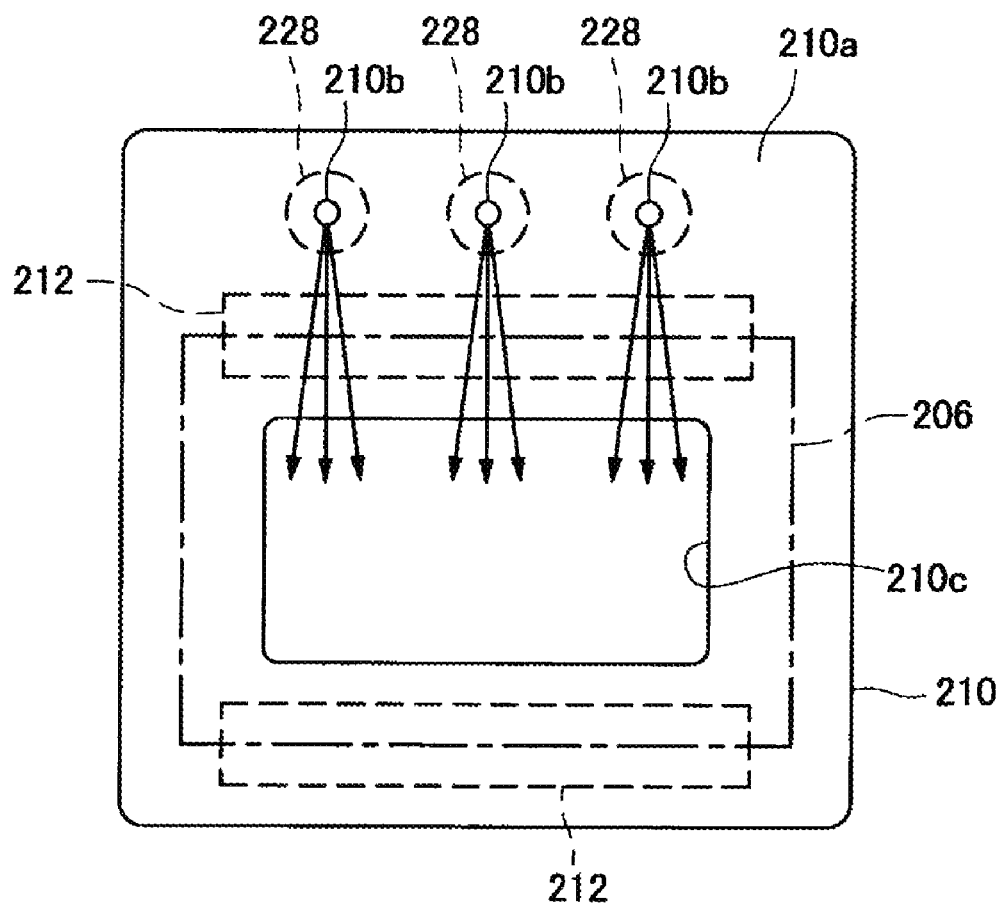
FIG. 6 is a plan view illustrating a metal plate of the imaging device unit of FIG. 5, as seen by a subject.

FIG. 6 is a plan view illustrating the metal plate 210 as seen by the subject. Referring to FIG. 6, an opening 210c through which light rays that have transmitted through a lens are to be passed is formed in the metal plate 210, and two piezoelectric elements 212 are disposed on boundary portions around the opening 210c, that is, behind the metal plate 210 in FIG. 5. The extension portion 210a is installed (formed) above the opening 210c.

Also, the hole 210b is formed in the extension portion 210a. For example, three holes 210b are formed as illustrated in FIG. 6.

Also, three pump chamber rubbers 228 are respectively disposed in positions correspond to the holes 210b.

Since the holes 210b are formed in the extension portion 210a, that is, above the opening 210c, air streams coming out of the holes 210b flow from top to bottom on the LPF 206.

Also, since gravity applies to dust or particles, due to the air stream and the gravity, dust or particles on a front surface of the LPF 206 are transported to a lower portion below the opening 210c, thereby completely transporting the dust or particles out of a light path.

When a voltage is applied to the piezoelectric elements 212 in the imaging device unit 200 according to the current embodiment, the piezoelectric elements 212 are in an extensional-compressional vibration mode in a length direction of the piezoelectric elements 212. Since the metal plate 210 adhered to the piezoelectric elements 212 is hardly extended in an extension direction of the piezoelectric elements 212, bending vibration occurs to a complex body including the piezoelectric elements 212, the metal plate 210, and the LPF 206 due to a difference in extension rates of the metal plate 210 and the piezoelectric elements 212.

Accordingly, a material point of an antinode of the bending vibration of the piezoelectric element 212 vibrates in an optical axis direction and has the greatest amplitude of vibration. Also, the amplitude of vibration of a material point at a node of the bending vibration is negligible, which means that a node of the bending vibration only performs rotational movement. A material point between an antinode and a node of the bending vibration conducts vibration in circular arcs around a node nearby to the point.

As described above, the metal plate 210, adhered to the piezoelectric elements 212, is in bending motion and the LPF 206 adhered to the metal plate 210 is also in bending motion together with the metal plate 210 according to the extension-compression motion due to the piezoelectric elements 212. As the LPF 206 is in bending motion, dust or particles attached to a surface of the LPF 206 that faces the subject are detached, thus removing the dust or particles from the surface of the LPF 206.

Also, when the extension portion 210a is in bending motion, the end portion of the pump chamber rubber 228 connected to the extension portion 210a vibrates in the optical axis direction together with the extension portion 210a. Also, when the metal plate 210 is in bending motion, an amplitude of vibration of the extension portion 210a increases sufficiently away from the piezoelectric elements 212, and the amplitude of bending motion at the hole 210b may be increased sufficiently.

Figure 7A:
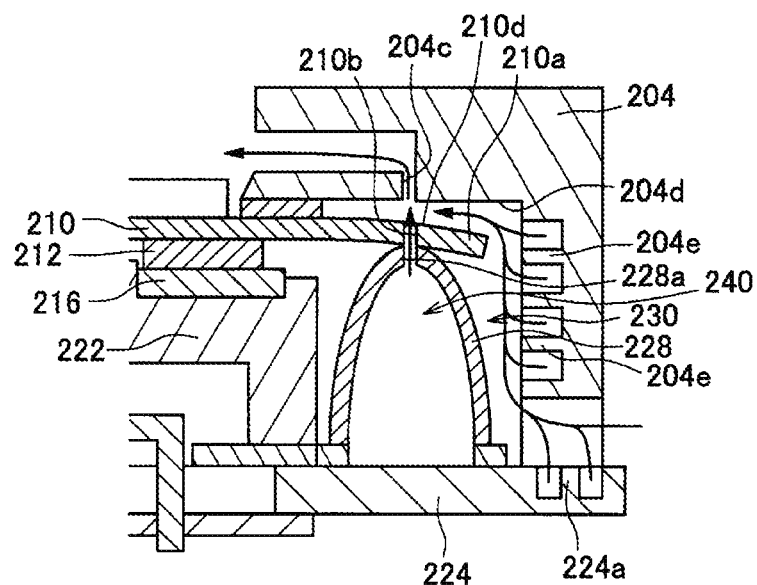
FIGS. 7A and 7B are schematic views illustrating the metal plate of FIG. 5 and a pump rubber chamber in a vibration condition.
Figure 7B:
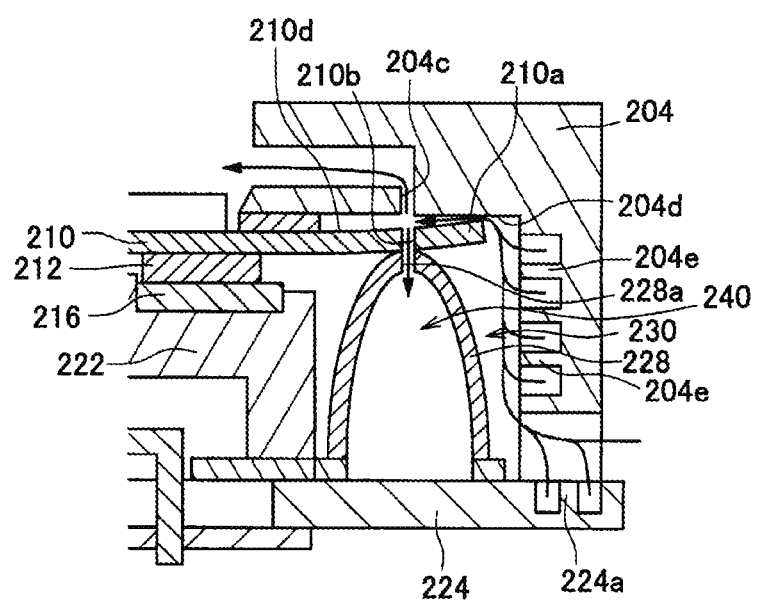

FIGS. 7A and 7B are schematic views illustrating the metal plate 210 and the pump chamber rubber 228 in a vibration condition.

Referring to FIG. 7A, the extension portion 210a is bent toward the heat dissipation plate 224. Referring to FIG. 7B, the extension portion 210a of the metal plate 210 is bent toward the subject.

As illustrated in FIG. 7A, when the extension portion 210a is bent toward the heat dissipation plate 224, the pump chamber rubber 228 is elastically deformed to be compressed in the optical axis direction, thereby reducing a capacity of the pump chamber 240 and discharging air in the pump chamber 240 through the hole 228a. The discharged air is passed through the hole 210b of the metal plate 210 and the hole 204c formed in the support frame 204 and sent to the air outlet path 204b.

When the air discharged from the pump chamber 240 is sent from the hole 210b to the hole 204c, a Venturi effect is generated and the air in the inner space 230 is introduced into the hole 204c and flows into the air outlet path 204b. In detail, the air in the inner space 230 flows through a gap between a surface 210d of the extension portion 210a toward the subject and a surface 204d of the support frame 204 facing the surface 210d and then passes through the hole 204c and is discharged through the air outlet path 204b. Accordingly, an air stream generated due to the change in the capacity of the pump chamber 240 is significantly increased due to the Venturi effect, and then the air stream is introduced into the air outlet path 204b.

As the air outlet path 204b is parallel to the surface of the LPF 206, the air stream discharged to the air outlet path 204b flows along the surface of the LPF 206. Accordingly, the dust or particles detached from the surface of the LPF 206 due to vibration of the LPF 206 are carried away with the air stream and discharged out of the light path. Also, the dust or particles remaining on a node of the surface of the LPF 206 may also be completely removed due to the increased flow of the air stream.

Also, as illustrated in FIG. 7B, when the extension portion 210a is bent toward the subject, the pump chamber rubber 228 is elastically deformed toward the subject and extended in the optical axis direction. Accordingly, the capacity of the pump chamber 240 is increased and air is introduced from the hole 228a into the pump chamber 240. However, the change in the capacity of the pump chamber 240 is small, and thus the air stream passing through the hole 204c in the inner space 230 and proceeding to the air outlet path 204b due to the Venturi effect is not cut off. Thus the air stream that has passed through the hole 204c is further sent to the air outlet path 204b in the condition illustrated in FIG. 7B.

Thus, according to the current embodiment, the condition of FIG. 7A and the condition of FIG. 7B are alternately repeated, that is, the holes 228a, 210b, and 204c function as Venturi nozzles, and the air stream discharged from the air outlet path 204b to the surface of the LPF 206 may be greatly increased. Accordingly, via the air stream with an increased flow amount, the dust or particles on the surface of the LPF 206 may be completely removed.

Also, since the amount of the air stream flowing through the air outlet path 204b from the air inlet path 204a is increased, the cooling effect of the imaging device 202 may be further increased. As illustrated in FIGS. 5 and 7, a heat dissipation pin 204e is formed on a wall surface of the support frame 204 facing the inner space 230. Also, heat dissipation pins 224a are formed in a wall surface of the heat dissipation plate 224 facing the air inlet path 204a.

As described above, the support frame 204 and the heat dissipation plate 224 are formed of a metal having a high thermal conductivity, such as aluminum. Accordingly, heat generated in the imaging device 202 is conducted to the heat dissipation plate 224, which surface-to-surface contacts the imaging device 202, is dissipated by the heat dissipation pin 224a, and is then sent from the air inlet path 204a to the air outlet path 204b with the air stream. Also, the heat of the heat dissipation plate 224 is transferred to the support frame 204 and is dissipated by the heat dissipation pin 204e, and is sent from the air inlet path 204a to the air outlet path 204b with the air stream. New air is introduced into the air inlet path 204a according to the flow of the air stream to the air outlet path 204b from outside the imaging device unit 200 (inside the photographing apparatus 300). Accordingly, the heat generated in the imaging device 202 may be efficiently dissipated out of the imaging device unit 200.

As described above, the air sent from the air outlet path 204b to the surface of the LPF 206 is discharged out of the imaging device unit 200 to thereby remove the dust or particles on the surface of the LPF 206. Also, by transmitting the discharged air through a dust prevention filter, the dust or particles contained in the discharged air stream may be removed and the air stream may be returned to the case of the photographing apparatus 300.

Modification Example of the Second Embodiment

Hereinafter, another example of the second embodiment will be described.

Figure 8:
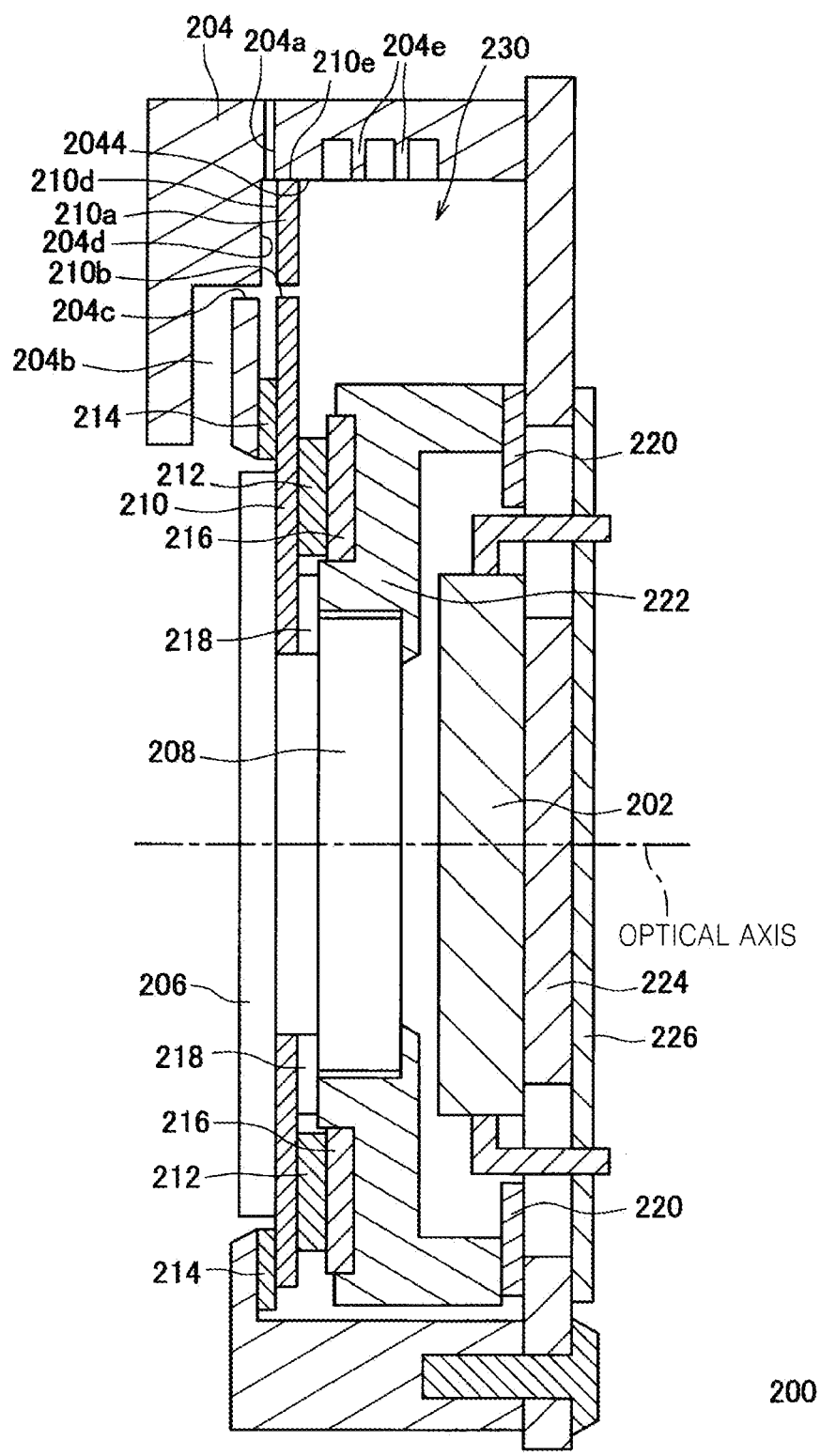
FIG. 8 is a cross-sectional view illustrating a modified example of an imaging device unit of FIG. 5.

FIG. 8 is a cross-sectional view illustrating a modified example of the imaging device unit of FIG. 5. Referring to FIG. 8, an upper end of the extension portion 210a is further extended upwardly.

According to the current example, a vibration mode of the piezoelectric elements 212 is adjusted in such a way that an upper end 210e of the extension portion 210a is a node for vibration. As the upper end 210e of the extension portion 210a is adjusted to be a node, the upper end 210e is only in rotational motion and the upper end 210e may be disposed near or in contact to an upper end surface 204f of an inner wall of the support frame 204.

Also, according to the current example, the air inlet path 204a is connected to an external side of the imaging device unit 200, and a space (gap) between the surface 210d of the extension portion 210a and the surface 204d of the support frame 204.

According to the current example, when the metal plate 210 is in bending motion, the inner space 230 may function as the pump chamber 240 according to the second embodiment.

In detail, when the extension portion 210a is bent toward the heat dissipation plate 224, the capacity of the inner space 230 is reduced and the air in the inner space 230 is discharged through the hole 210b of the metal plate 210. The discharged air is passed through the hole 204c formed in the support frame 204 and is sent to the air outlet path 204b.

When the air discharged from the inner space 230 is sent from the hole 210b to the hole 204c, the Venturi effect is generated and thus the air is passed through the air inlet path 204a, flows between the gap between the surface 210d and the surface 204d, and then is passed through the hole 204c and discharged out of the air outlet path 204b. Accordingly, the air stream generated due to the change in the capacity of the inner space 230 is greatly increased using the Venturi effect, and then the air stream may be introduced into the air outlet path 204b.

Also, when the extension portion 210a is bent toward the subject, the capacity of the inner space 230 is increased and the air is introduced from the hole 210b into the inner space 230. However, as the change in the capacity of the inner space 230 is small, the flow of the air stream that is passed through the hole 204c and that proceeds to the air outlet path 204b due to the Venturi effect is not cut off and is further sent to the air outlet path 204b.

According to the current example, the inner space 230 may function as the pump chamber 240 of the second embodiment, and thus there is no need to use the pump chamber rubber 228. Thus an air stream due to the Venturi effect may be generated using a simpler structure.

As described above, the hole 210b of the metal plate 210, the hole 204c of the support frame 204, the air inlet path 204a, and the air outlet path 204b constitute an air stream supply unit according to the second embodiment and the modified example of the second embodiment.

As described above, according to the second embodiment and the modified example of the second embodiment, an air stream generated due to vibration of the metal plate 210 may be increased using the Venturi effect. Thus, dust or particles may be completely removed using the increased air stream and the cooling effect of the imaging device 202 may be further increased at the same time.

Accordingly, an imaging device unit in which dust or particles attached to the imaging device unit are completely removed therefrom, and an electronic apparatus including the imaging device unit are provided.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. An imaging device unit comprising:
   an imaging device comprising an imaging surface on which an optical image of a subject is to be formed, and for converting the optical image to an electrical signal;
   an optical unit disposed nearer to the subject than the imaging device;
   a piezoelectric element mounted on the optical unit to vibrate the optical unit; and
   an air stream supply unit for generating an air stream by using a change in a capacity of a predetermined space, the change in the capacity of the predetermined space being generated due to vibration of the piezoelectric element to supply the air stream to a surface of the optical unit.

2. The imaging device unit of claim 1, wherein the air stream supply unit generates the air stream by using a change in a capacity of inner space between the optical unit and the imaging device.

3. The imaging device unit of claim 2, wherein the air stream supply unit comprises:
   an inlet valve for introducing air into the inner space when the capacity of the inner space is increased; and
   a outlet valve for discharging the air from the inner space when the capacity of the inner space is reduced,
   wherein the air stream supply unit supplies the air stream discharged from the outlet valve to the surface of the optical unit.

4. The imaging device unit of claim 1, further comprising:
   a plate mounted on a boundary portion of the optical unit, wherein at least a portion of the plate extends beyond the optical unit; and
   a support frame for supporting the optical unit and the imaging device,
   wherein the air stream supply unit generates the air stream by using a change in a capacity of a predetermined space in the supporting frame, the change in the capacity of the predetermined space in the supporting frame being generated due to vibration of the plate.

5. The imaging device unit of claim 4, wherein a first hole is formed in the plate, and air is discharged through the first hole according to a change in a capacity of the space, and a second hole is formed in a portion of the support frame corresponding to the first hole and connected to a path that supplies the air stream to the optical unit, wherein an air stream greater than the air stream through the first hole is supplied to the surface of the optical unit, due to a Venturi effect that is generated when the air stream is passed through the first and second holes.

6. An electronic apparatus comprising:

a photographing optical system for forming an optical image of a subject;

an imaging device comprising a surface on which the optical image of a subject is to be formed, and for converting the optical image to an electrical signal;

an optical unit disposed nearer to the subject than the imaging device;

a piezoelectric element mounted on the optical unit to vibrate the optical unit; and an air stream supply unit for generating an air stream by using a change in a capacity of a predetermined space, the change in the capacity of the predetermined space being generated due to vibration of the piezoelectric element to supply the air stream to a surface of the optical unit.

7. The electronic apparatus of claim 6, wherein the air stream supply unit generates the air stream by using a change in a capacity of inner space between the optical unit and the imaging device.

8. The electronic apparatus of claim 7, wherein the air stream supply unit comprises:

an inlet valve for introducing air into the inner space when the capacity of the inner space is increased; and an outlet valve for discharging the air from the inner space when the capacity of the inner space is reduced, wherein the air stream supply unit supplies the air stream discharged from the outlet valve to the surface of the optical unit.

9. The electronic apparatus of claim 6, further comprising:

a plate mounted on a boundary portion of the optical unit, wherein at least a portion of the plate extends beyond the optical unit; and a support frame for supporting the optical unit and the imaging device, wherein the air stream supply unit generates an air stream by using a change in a capacity of the predetermined space in the support frame, the change in the capacity of the predetermined space in the supporting frame being generated due to vibration of the plate.

10. The electronic apparatus of claim 9, wherein a first hole is formed in the plate, and air is discharged through the first hole according to a change in a capacity of the space, and a second hole is formed in a portion of the support frame corresponding to the first hole and connected to a path that supplies the air stream to the optical unit, wherein an air stream greater than the air stream through the first hole is supplied to the surface of the optical unit, due to a Venturi effect that is generated when the air stream is passed through the first and second holes.

* * * * *